United States Patent [19]

Finkelstein et al.

[11] Patent Number: 5,621,717
[45] Date of Patent: Apr. 15, 1997

[54] READING OPTICAL DISKS HAVING SUBSTRATES WITH DIVERSE AXIAL THICKNESSES

[75] Inventors: Blair I. Finkelstein, Tucson, Ariz.; Timothy C. Strand, San Jose, Calif.

[73] Assignee: International Business Machines Corporation, Armonk, N.Y.

[21] Appl. No.: 476,739

[22] Filed: Jun. 7, 1995

[51] Int. Cl.⁶ .................................................. G11B 7/00
[52] U.S. Cl. ...................... 369/112; 369/116; 369/44.25; 369/54; 369/94
[58] Field of Search .................................. 369/112, 103, 369/106, 44.25, 44.32, 54, 100, 116, 94; 359/19; 365/32

[56] References Cited

U.S. PATENT DOCUMENTS

| | | | |
|---|---|---|---|
| 4,460,990 | 7/1984 | Opheij | 369/112 |
| 4,914,725 | 4/1990 | Belser et al. | 318/560 |
| 5,070,495 | 12/1991 | Bletscher, Jr. et al. | 369/116 |
| 5,072,437 | 12/1991 | Chikuma | 369/118 |
| 5,202,875 | 4/1993 | Rosen et al. | 369/94 |
| 5,268,893 | 12/1993 | Call et al. | 369/116 |
| 5,309,461 | 5/1994 | Call et al. | 372/38 |
| 5,349,592 | 9/1994 | Ando | 372/32 |
| 5,396,476 | 3/1995 | Asthana | 369/44.25 |
| 5,434,840 | 7/1995 | Ezuka et al. | 369/100 |
| 5,446,565 | 8/1995 | Komma et al. | 359/19 |

OTHER PUBLICATIONS

Born et al *Principles of Optics*, Permagon Press, 1975, pp. 416–417 and 440–441.
Strand et al., "Aberration Limits for Annular Gaussian Beams for Optical Storage", Applied Optics, vol. 33, No. 16, 1 Jun. 1994, pp. 3533–3539.

*Primary Examiner*—Loha Ben
*Attorney, Agent, or Firm*—D. A. Shifrin; H. F. Somermeyer

[57] ABSTRACT

An optical disk player reads either thin-substrate disks or thick-substrate disks. The disk players optical system is designed for reading the thin-substrate optical disks and has an effective numerical aperture. Thick-substrate optical disks having a thicker substrate than the thin-substrate optical disk result in the laser beam reading such thick-substrate optical disks having spherical aberration sufficient to prevent reliable data detection. When thick-substrate optical disks are being read, the read portion of the optical system is automatically changed to accommodate the undesired spherical aberration. The thick-substrate disk reflected laser beam is subjected to annular filtering that reduces spherical aberration sufficiently for enabling data and servo signal detection. Annular filtering is provided in an optical read path by an effective opaque or translucent disk centrally located in a pupil of the laser beam optical filter disposed in the read portion. An apertured plate having an aperture comparable to a known diffraction limited spot size is disposed between the laser beam filter and photo detectors. The apertured plate is disposed in the focal region of a lens in the optical read path.

31 Claims, 5 Drawing Sheets

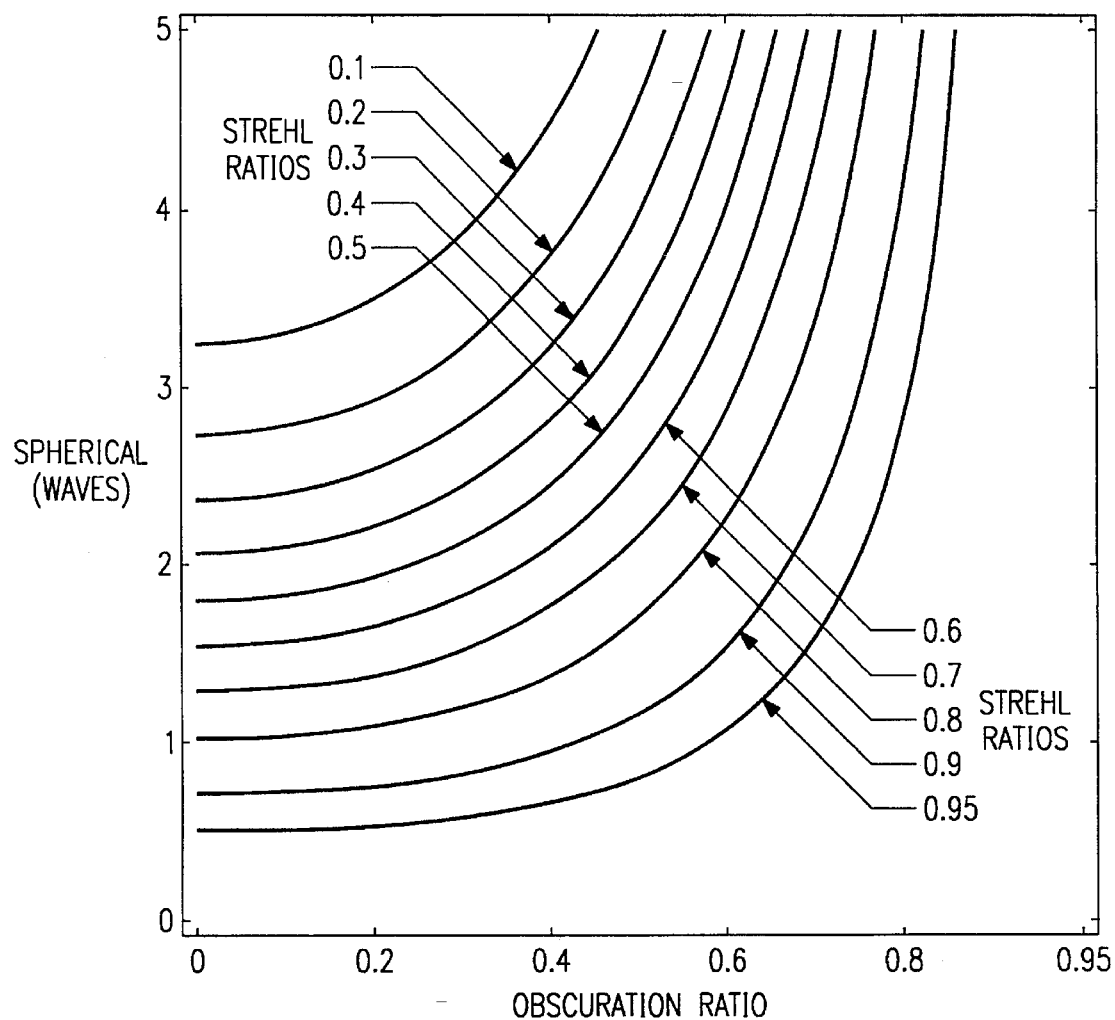
FIG. 7
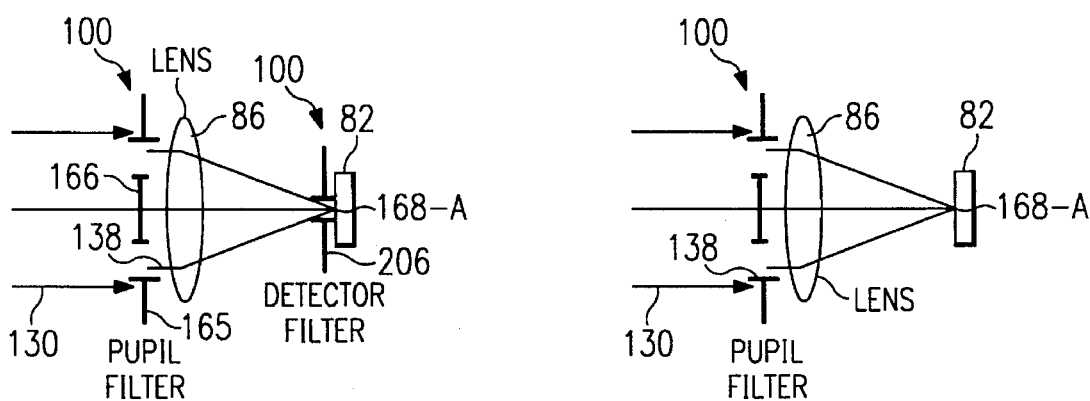
FIG. 8
FIG. 9

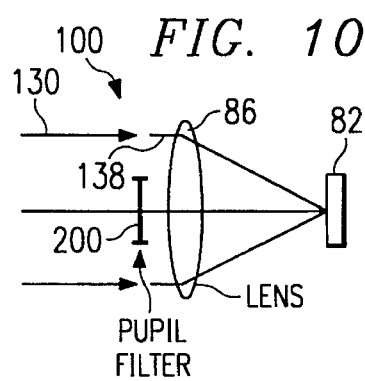 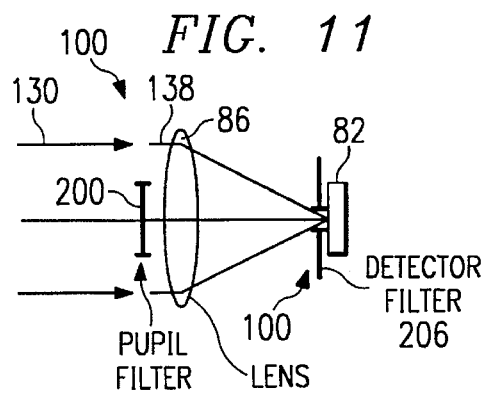 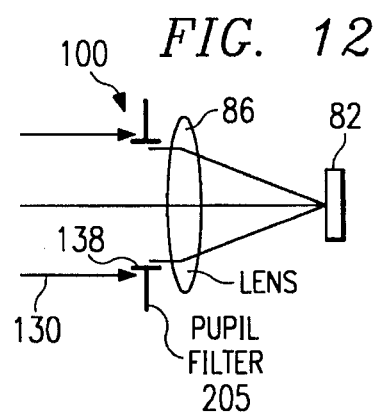 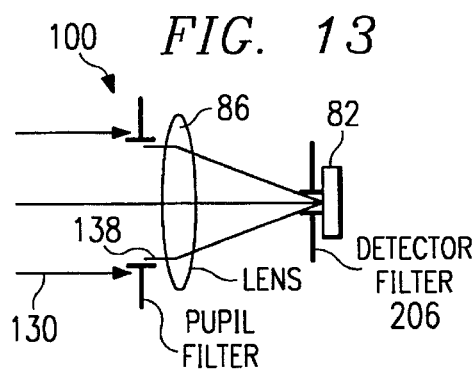 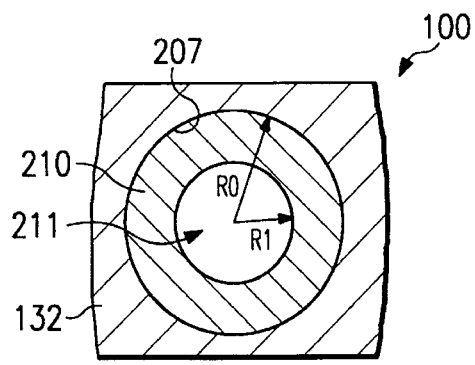 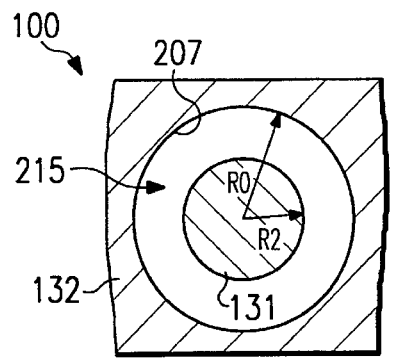 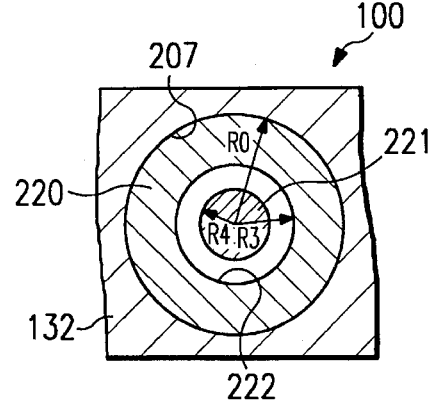

READING OPTICAL DISKS HAVING SUBSTRATES WITH DIVERSE AXIAL THICKNESSES

FIELD OF THE INVENTION

This invention relates to optical disk players, more particularly to those optical disk players capable of reading data from optical disks having substrates of diverse axial thicknesses.

BACKGROUND OF THE INVENTION

Optical data storage systems have employed optical disks, such as magneto-optical, ablative or other types of optical disks. Such optical disks have substrates with axial dimensions that limit areal recording densities. Efforts are continuing to increase the areal densities of such optical disks. Such increased areal densities require shorter laser beam wavelengths, larger numerical apertures in the optical system and a smaller track pitch. Such changes result in increased difficulties in disk manufacture. Such manufacturing difficulty increases disk costs. Since data storage is cost competitive, a different approach is required.

One approach for increasing areal density of optical disks is to decrease the axial thickness of the transparent substrate. Such thinner substrates result in shorter optical paths within the substrates to and from an embedded reflective magneto optical recording layer. Current transparent substrates are relatively thick, i.e. 1.2 millimeters (mm),for example, Reducing the axial thickness of the transparent substrate creates an incompatibility problem between original optical disks (termed herein thick-substrate disks) and newer axially thinner substrates having an axial thickness of about 0.6 mm. An optical system designed to operate with (read from, erase and write to) the thin-substrate optical disks results in excessive spherical aberration from thick-substrate disks preventing successfully reading from or writing to such thick-substrate optical disks. It is highly desired to provide thin-substrate optical disks for achieving greater areal recording densities while maintaining capability to access data recorded in thick-substrate disks. Such desire is termed "backward compatibility". As it turns out, read access to the older thick disks satisfies most backward compatibility requirements, i.e. maintain access to old data. It is also desired to enable automatic controls for facilitating such backward compatibility without requiring separate optical disk drives for the two types of optical disks.

An effective low-cost method and apparatus for reducing the effects of spherical aberration of reflected laser beams from thick-substrate optical disks (reading such disks) in optical devices designed for writing to and reading from thin-substrate optical disk is needed.

DISCUSSION OF PRIOR ART

Opheij in U.S. Pat. No. 4,460,990 shows an optical information device having a substantially rotationally symmetrical element with an annular radiation-attenuating peripheral portion for reducing cross-talk between radially-adjacent data tracks. Such a filter in the write or recording optical path is avoided by the present invention.

Chikuma in U.S. Pat. No. 5,072,437 shows preventing a drop in optical signal level at high spatial frequencies with a central obscuration in a write path of an optical device. Chikuma shows either a shield plate having a pin-hole or a photo detector having plural light-receiving elements. A selection circuit selects the arrangement providing a greater output intensity.

Ando in U.S. Pat. No. 5,349,592 shows a so-called super-resolution system having compound optical surfaces for wave front splitting to obtain phase-shifted beam components. This phase changing does not involve central obscuration. This arrangement is not aberration compensation and does not involve any switching operations in a read optical path.

Rosen et al in U.S. Pat. No. 5,202,875 show compensating for aberration in a write path of an optical device. Rosen et al apply the write aberration compensation for accessing multiple recording layers in one optical disk for both reading and writing. Several embodiments for achieving reading and writing at the plural recording layers are described. A so-called multiple data surface filter has relatively movable parts for obtaining different laser beam properties. This teaching requires that the plural recording layers be laser beam transmissive. It is desired to avoid this latter requirement.

T. C. Strand et al in the article "ABERRATION LIMITS FOR ANNULAR GAUSSIAN BEAMS FOR OPTICAL STORAGE", APPLIED OPTICS, Vol. 33, NO. 16, pp 3533–3539, Jun. 1, 1994, discuss aberrations of annularly apodised beams traveling through an optical write path. Strand et al teach, inter alia, that annularly apodised beams have a reduced sensitivity to spherical aberration. Strand et al also illustrate defocus effects, astigmatism, effects of aberration and the Strehl ratios (optical merit function).

The above-cited prior art references include an optical filter in a write path. Contrary to these prior art teachings, the present invention teaches that placing an optical filter in an optical read path enables successful reading of data without any filter in the optical write path.

SUMMARY OF THE INVENTION

This invention provides low-cost read-back backward-compatibility in an optical device to older thick-substrate optical disks while enabling reading and writing on thin-substrate optical disks. Writing backward compatibility is not provided. This invention is applicable to devices that employ all types of optical disks, such as magneto-optic, ablative, phase-change, color based whether rewriteable, write-once or read only.

In accordance with one aspect of the invention, an optical disk device has an optical system designed primarily to operate with thin-substrate optical disks for enabling higher areal recording densities than provided by older thick-substrate optical disks. Facilities are provided to selectively automatically provide read-only access to older thick-substrate optical disk.

In one embodiment, a laser-beam annular optical filter, also termed a pupil filter, is inserted in an optical read portion of the devices optical system to enable reading a thick-substrate optical disk. The laser-beam annular optical filter may be achieved as by an opaque (laser beam attenuating) mask, rotatable holographic mask, electrically controller liquid crystals and the like. Effectively, two optical paths are provided. In one of the optical paths a laser-beam annular filter is provided for reading thick-substrate optical disks. A second optical path, without the laser-beam annular filter, enables reading from and writing to thin-substrate optical disks. For switching operation between the two paths, automatic means selects one of the two optical detectors in the respective first and second optical paths.

In another embodiment, an aperture having a numerical aperture value less than the effective numerical aperture of the optical read system is optically interposed between the laser beam filter and a photo detector. A detector filter may be disposed in a focal region of a lens that focusses the beam onto a photo detector. The detector filter has an aperture determined by a cross-sectional size of a focussed spot on the photo detector.

The foregoing and other objects, features and advantages of the invention will be apparent from the following more particular description of preferred embodiments of the invention, as illustrated in the accompanying drawings.

DESCRIPTION OF THE DRAWING

FIG. 1-A is a simplified schematic diagram of a laser beam read path used in the FIG. 1 illustrated optical device.

FIG. 7 is a graph illustrating relationships of obscuration ratios, spherical aberration and Strehl ratios.

FIGS. 8–16 are simplified schematic diagrams showing selected embodiments of the present invention.

DETAILED DESCRIPTION

Figure 1:
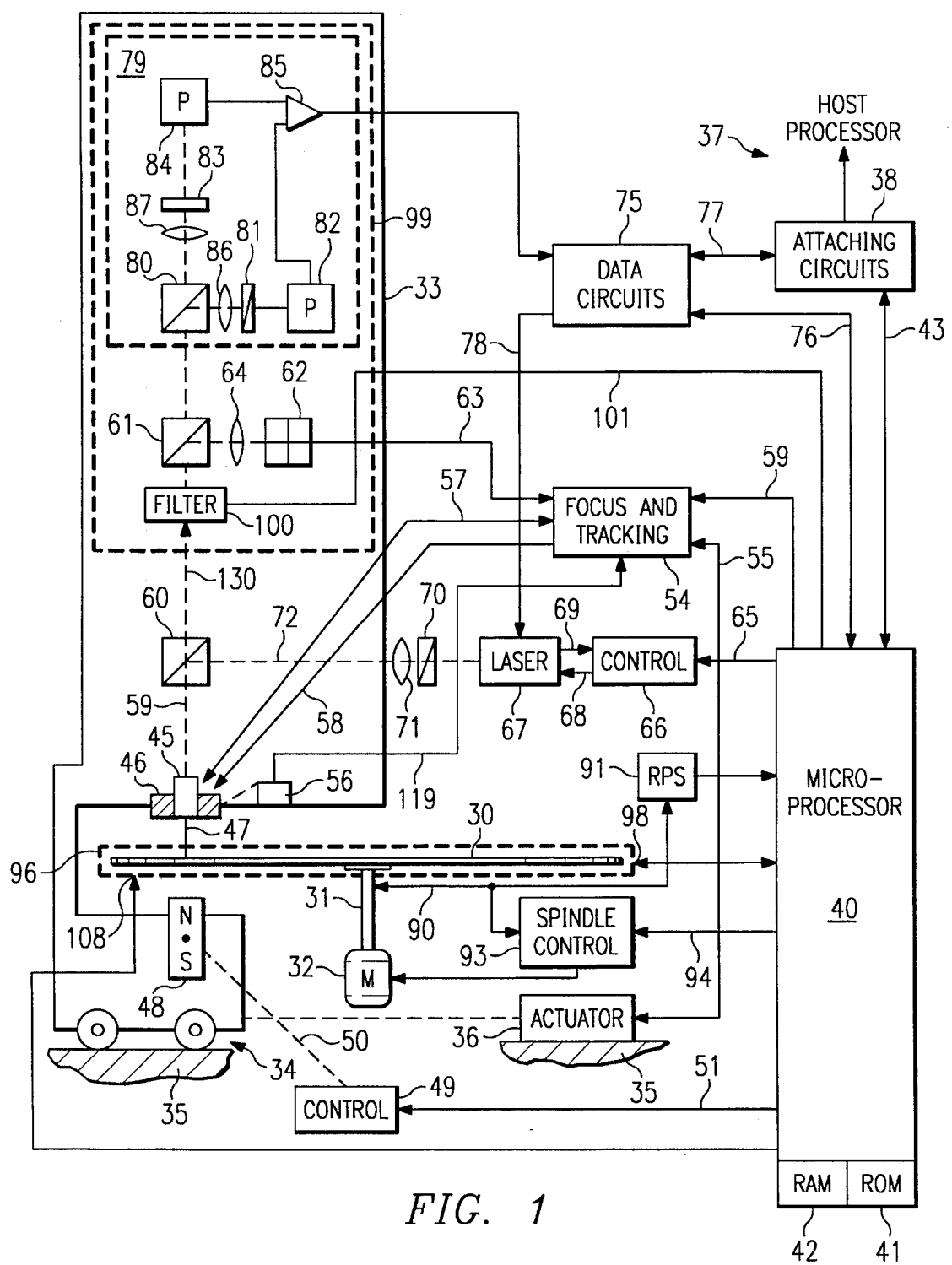
FIG. 1 illustrates in simplified block diagram form an optical device having means for practicing the present invention.

The present invention enables reading from thick and thin substrate optical disks of all types while maintaining efficient writing on the thin-substrate optical disks of any writeable type. While the overall FIG. 1 illustrated optical system is designed to primarily operate with higher areal density thin-substrate magneto-optical disks, thick-substrate magneto-optical disks are treated as being read only. Magneto-optical disks are selected for purposes of illustrating the present invention, no limitation thereto intended. For backward compatibility to the thick-substrate optical disks, the effects of unwanted spherical aberration induced into a thin-substrate designed optical system provided laser beam by a thick-substrate optical disk are removed by either converting the read laser beam having thick-substrate induced aberration from a somewhat circular cross-section to an annular cross-section. If a pupil in the optical read path has a radius R, then an inner radius an a light annulus of a centrally obscured optical beam $R_1$ may be in the range $0 \leq R_1 < R_0$. If $R_1 = 0$, then there is no central obscuration of the optical beam. An outer radius of the light annulus $R_2$ may be in the range $R_1 < R_2 \leq R_0$, $R_2 = R_0$ implies no reduction in the optical path numerical aperture (NA). The term annulus or annular, as used herein, not only include an annulus as described above, but also a circle having a radius less than the radius of an optical pupil. While circular annuli are preferred, no limitation thereto is intended. Non-circular annuli may be used.

Figure 1A:
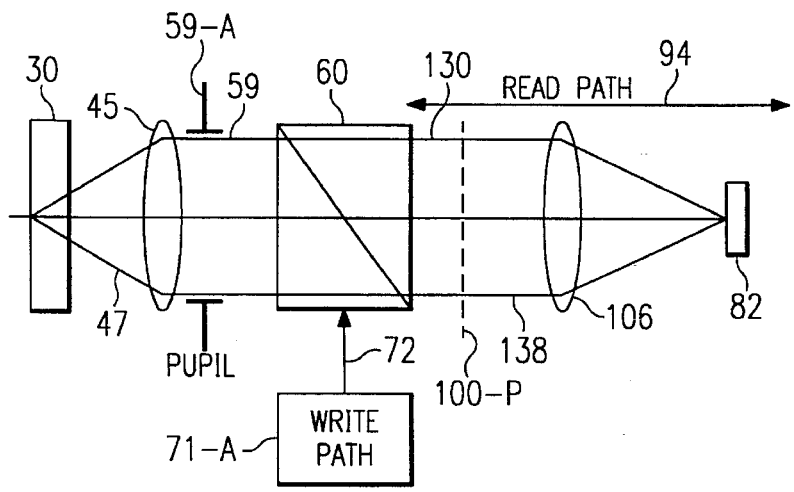

Referring first to FIG. 1A, a simplified description of operation of optical read paths is given based on the FIG. 1 illustrated light path including data photo detector 82. Write path 71-A supplies a laser beam over light path 72 to beamsplitter 60. The laser beam is reflected over light path 59 through objective lens 45 over light path 47 to optical disk 30. While the laser beam is a read beam (low light intensity, for example), the disk 30 reflected laser read beam retraces light path 47, through objective lens 45 over path 59 to splitter 60. Splitter 60 passes one-half of the reflected laser read beam to a optical read portion 99 as reflected beam 130. Lens 86 focusses the reflected light beam onto data photo detector 82. In accordance with the present invention a laser beam annular filter 100 (FIG. 1), also termed a pupil filter, is disposed between beamsplitter 60 and lens 86. Laser-beam annular filter 100 for reading thick-substrate disks converts reflected laser read beam 130 into an annular beam 138. Lens 86 focusses annular beam 138 onto data photo detector 82. For reading thin-substrate optical disks, laser read beam annular filter 100 makes no changes in the reflected laser read beam 130. Numeral 59 indicates an effective pupil size for the optical system.

Applicants provide a low-cost effective reflective beam-shape conversion to the annular beam 138 shape by selectively blocking either a central portion, an outer portion, or both the central and outer portions, of the disk 30 reflected laser read beam while reading data from thick-substrate optical disks. Laser-beam annular filter 100 is disposed in optical read portion 99 of the FIG. 1 illustrated optical device. Laser-beam annular filter 100 may be microprocessor controlled so that the annular filter is automatically used only for reading thick-substrate optical disks. In the latter arrangement, while reading data from thin-substrate optical disks, filter 100 provides no beam cross-sectional shape conversion. While reading thick-substrate optical disks, filter 100 converts or processes the read laser beam from the usual somewhat circular shape to an annular shape. It is noted that the annular filter positioning with respect to the read laser beam is not critical, i.e. can be displaced from the beam center. The above-cited T. C. Strand et al article sets forth the optical effects of annular filters and their reduction of aberration sensitivity for the read laser beam. As used hereinafter, the term obscuration ratio is the inner diameter of an annular aperture divided by the outer diameter of such annular aperture, i.e. $R_1$ to $R_2$.

An optical system that requires a Stehl ratio of 0.95 or more for reading thin-substrate optical disks, may tolerate aberration to the read laser beam of 0.5 cycles or waves of aberration. Adding a laser beam filter having a obscuration ratio of 0.8 increases aberration tolerance to five waves of aberration. Using these figures, an optical system for a thin-substrate optical disk having an NA of 0.55 can be used with annular aperture for successfully reading the described thick-substrate optical disks.

While reading thick-substrate optical disks, laser-beam annular filter 100 reduces the optical read path efficiency. The laser read beam power level may be increased so long as the laser beam power does not approach erasure or write beam levels. For example, if the central obscuration ratio is 0.8 for a Gaussian-profile laser beam having a light intensity at the edge of the aperture of $1/e^2$ of the light intensity at the center of the beam, about one-fifth of the reflected laser beam is transmitted through filter 100. This example indicates that the laser read power level would have to be increased by a power of five. Such an increase in laser read beam power may cause data erasure problems. Note that the write optical path from the laser to the disk does not have a filter. Filter 100 is in the read portion 73 of the optical system, i.e. filter 100 receives light reflected from optical disk 30. In accordance with the present invention, a laser-beam annular filter 100 is provided, as later described, that enables using the usual laser read beam power level for reading data from both thin-substrate and thick-substrate optical disks 30.

Annular filtering of the reflected light beam 130 results in optical side lobes in the resulting focussed laser spot. For the lower density recording on thick-substrate optical disks, such side lobes appear not to be a problem in reading data from such optical disks. It appears that the read out annular beam can have an effective full-width and maximum height better than the laser beam without annular laser beam filtering. If inter-track cross-talk or inter-symbol interference are problems, then a small circular aperture disposed between the read-path lens and photo-detector(s) centered at the focal point of the read-path lens, for enhanced signal detection, removes unwanted side lobes from the annular laser read beam. An additional aperture disposed in a focal region of a lens at a photo detector is termed a detector filter. A detector filter has an aperture determined by a cross-sectional size of a focussed spot of a focussing lens.

Referring now more particularly to the appended drawing, like numerals indicate like structural parts and features in the various figures. An optical recorder with which the present invention may be advantageously employed is shown in FIG. 1. A magneto optic record disk 30 is removably mounted on spindle 31 for rotation by motor 32. Disk 30 may be either a later-described thin-substrate or thick-substrate optical disk. Dashed line box 96 represents a known cartridge receiver in a play position. Optical head-carrying arm 33 on head-arm carriage generally denoted by numeral 34, moves radially of disk 30. A frame 35 of recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36, suitably mounted on frame 35, radially moves carriage 34 for enabling track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode—storing, read-only memory (ROM) 41 and a data and control signal storing random access memory (RAM) 42.

The optics of the recorder include an objective or focussing lens 45 mounted for focussing and tracking motions on head-arm 33 by fine actuator 46. This actuator includes mechanisms for moving lens 45 toward and away from disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magneto optic recording, magnet 48 (in a constructed embodiment magnet 48 is an electromagnet) provides a weak magnetic steering field for directing the remnant magnetization direction of a small spot on disk 30 illuminated by laser light from lens 45. The laser light spot heats the illuminated spot on the record disk to a temperature above the Curie point of the magneto optic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet control 49, which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47, such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, circuits 54 control signals travel over lines 57 and 58, respectively, for focus and fine tracking and switching actions of fine actuator 46. Lines 57, 58 respectively carry a position error signal to circuits 54 and a position control signal from circuits 54 to the focus and tracking mechanisms of actuator 46. Sensor 56 senses the relative position of fine actuator 46 to head-arm carriage 33.

The focus and tracking position sensing is achieved by analyzing laser light reflected from disk 30 over path 47, thence through objective lens 45, through one-half mirror 60 and to be reflected by half-mirror 61, then through focussing lens 64 to a so-called "quad detector" 62. Quad detector 62 has four photo elements which respectively supply signals on four lines, collectively denominated by numeral 63, to focus and tracking circuits 54. In accordance with the present invention, filter 100 is optically interposed between one-half mirrors 60 and 61 to provide reading data via data photo detectors 82 and 84 from both thick-substrate and thin-substrate optical disks. In the illustrated embodiment, microprocessor 40 controls laser-beam annular laser-beam annular filter 100 via signals sent over line 101 to select one of two optical connections (later described) of filter 100. A first optical connection in filter 100 matches operation of a primary design of the FIG. 1 illustrated optical system for reading from a thin-substrate optical disk 30. A second later described connection of laser-beam annular filter 100 provides annular filtering of the read or reflected laser beam for reading data recorded in a thick-substrate optical disk. Microprocessor 40 responds to later-described cartridge-received sensor 98 to read disk-type sensor 108 to control laser-beam annular filter 100, all as will become apparent.

Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 supplies a suitable magnetic field for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by intensity modulation. In this regard, data circuits 75 (later described) supply data-indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplied control signals over line 76. Microprocessor 40 in preparing circuits 75 is responding to commands for recording received from a host processor 37 via attaching circuits 38. Once data circuits 75 are prepared, data is transferred directly between host processor 37 to data circuits 75 through attaching circuits 38. Data circuits 75 also includes ancillary circuits (not shown) relating to disk 30 format signals, error detection and correction and the like. Circuits 75, during a read or recovery action, strip the ancillary signals from the read back signals before supply corrected data signals over bus 77 to host processor 37 via attaching to 38.

Reading or recovering data from disk 30 for transmission to a host processor requires optical and electrical processing of the laser light beam from the disk 30. For magneto-optical disks, that portion of the reflected light (which has its linear polarization from polarizer 70 rotated by disk 30 recording using the Kerr effect) travels along the two-way light path 47, through lens 45, laser-beam annular filter 100 and half-mirrors 60 and 61 to the data detection portion 79 of the head-arm 33 optics. Half-mirror or beamsplitter 80 divides the reflected beam into two equal intensity beams both having the same reflected rotated linear polarization. The half-mirror 80 reflected light travels to data photo detector 82 through lens 86 and first polarizer 81. First polarizer 81 is set to pass only that reflected light which was rotated when the remnant magnetization on disk 30 spot being accessed has a "north" or binary one indication. Data photo detector 82 responds to the passed light for supplying a suitable indicating signal to differential amplifier 85. When the reflected light was rotated by a "south" or erased pole direction remnant magnetization, then polarizer 81 passes no or very little light resulting in no active signal being supplied by data photo detector 82. The opposite operation occurs by lens 87 and second polarizer 83 which passes only "south" rotated laser light beam to data photo detector 84. Data photo detector 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 2:
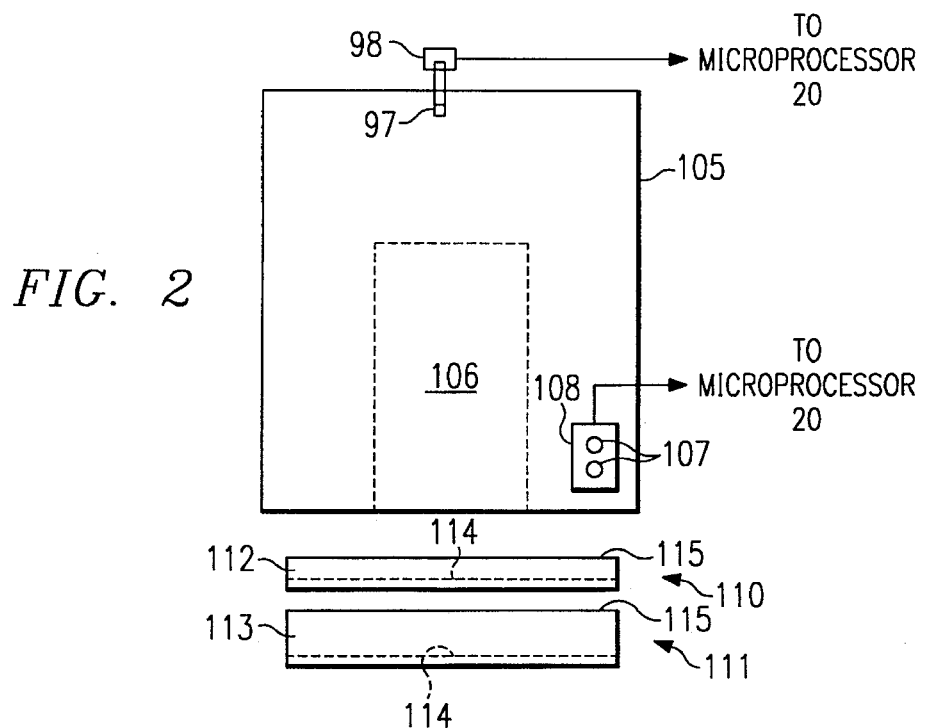
FIG. 2 illustrates an optical disk cartridge for carrying either a thin-substrate or thick-substrate optical disk to be used in the FIG. 1 illustrated optical device.

Optical disk cartridge 105 (FIG. 2) is used for containing either a thin-substrate optical disk represented by rectangle 110 or a thick-substrate optical disk represented by rectangle 111. The present invention is also usable with disks not contained in a cartridge or other housing. Thin-substrate optical disk 110 has transparent substrate 112 of an axial thickness about 0.6 mm. In contrast, thick-substrate optical disk 111 has thick substrate 113 of about 1.2 mm axial thickness. Radiation receiving surface 115 of both optical disks 110 and 111 receive and reflect laser beam radiation for accessing the respective recording layers 114 embedded in the respective optical disks. A thinner cartridge may be used to contain the thin-substrate optical disk 110. Disk 30 of FIG. 1 can be either disks 110 or 111. Shutter 106 provides the usual access to the cartridge 105 contained optical disk.

The FIG. 1 illustrated device includes cartridge-received sensor 98. Sensor 98 may include a spring arm 97 engageable by a received cartridge 105. The engagement closes a switch (not shown) in sensor 98 for signaling microprocessor 20 that a cartridge has been received. Microprocessor 20 responds by sensing disk-type sensor 108 that senses detents/cavities 107. For example, if no cavities 107 are detected, then a thick-substrate disk is indicated while if one or two cavities 107 are detected than a thin-substrate optical disk is indicated. Alternately, cartridge-received sensor 98 may have two actuated positions, one resulting from a thin-substrate cartridge 105 (short motion of arm 97) and a second position indicating a thick-substrate cartridge 105 (long motion of arm 97). The optical disks may also have self-identifying machine sensible indicia indicating the type of optical disk has been received by the FIG. 1 illustrated device.

Figure 3:
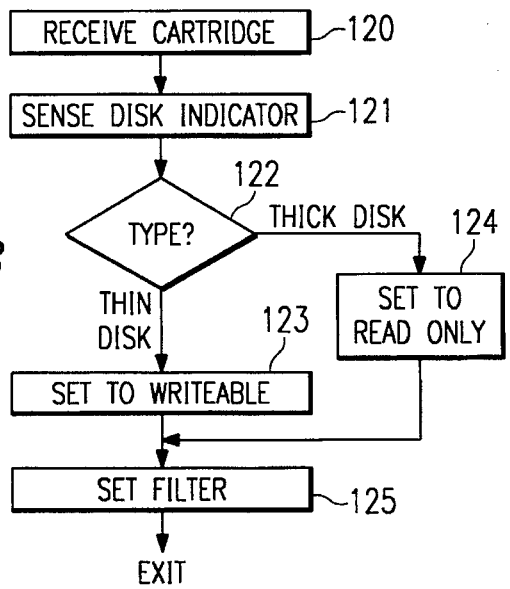
FIG. 3 is a machine operations flow chart usable in the FIG. 1 illustrated device for automatically detecting a thin-substrate or thick-substrate optical disk.

The FIG. 3 operations flow chart illustrate action by microprocessor 20 to control laser-beam annular filter 100. Step 120 responds to cartridge-received sensor to indicate that a cartridge has been received in the FIG. 1 illustrated device. Step 121 senses the disk indicator for determining the type of received optical disk. Step 122 responds to a thin disk (thin-substrate disk) to effect step 123 enabling writing to the received thin-substrate optical disk. Similarly, step 122 responds to a thick disk (thick-substrate optical disk) to effect step 124 to set all operations to read only. Step 125 sets filter 100 to pass the disk reflected laser read beam without modification or to process the disk reflected laser read beam for reading a thick-substrate optical disk.

Figure 4:
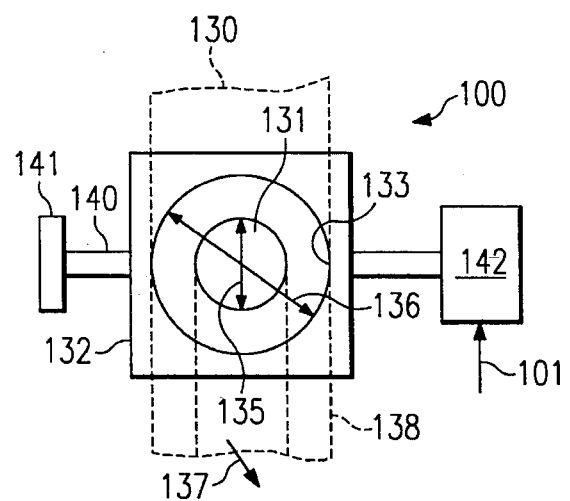
FIGS. 4 and 5 show two illustrative laser beam filters usable with the FIG. 1 illustrated device.

FIGS. 4–6 and 8–16 respectively illustrate diverse illustrative embodiments for practicing the present invention. These embodiments are for illustrations only and not intended to limit the present invention. FIG. 4 diagrammatically illustrates one embodiment of filter 100 that mechanically moves an laser-beam annular filter mechanism between obscuring and clear positions. Dashed line 130 represents a disk-reflected laser read beam having significant spherical aberration when reflected by a thick-substrate optical disk and little, if any, spherical aberration when reflected by a thin-substrate optical disk. The laser-beam annular filter 100 includes a central holographic disk 131 in pupil 133, a transparent member supported by opaque support 132. Holographic disk 131 mounted on the pupil 133 transparent member when pivoted about pivot rod 140 to a first position results in the reflected laser beam 130 impinging on holographic disk 132 for passing beam 138 to beamsplitter 61 (FIG. 1) effectively without annular filtering—i.e. used for thin-substrate optical disks. For processing reflected laser beam 130 from a thick-substrate optical disk, pivot rod 140 pivots to a second pivoted position. While holographic disk 131 is in the second pivoted position, the impinging reflected laser beam is refracted by holographic disk 131 away from beam 138, as indicated by arrow 137. This refraction provides an effective opaqueness by refracting the reflected laser beam 130 portion impinging on holographic disk 132 away from beam 138 resulting in beam 138 having an annular cross-section. The obscuration ratio of the FIG. 4 illustrated device is the diameter 135 of holographic disk 131 divided by the diameter 136 of pupil 133.

Pivoting opaque support 132 is effected by microprocessor 20 supplying a suitable control signal over line 101 to pivoting motor 142 that is mounted on a frame (not shown) of the FIG. 1 illustrated device. Pivot rod 140 is suitably journalled in boss 141, mounted on support 33. Read optics may be mounted on frame 35.

Figure 5:
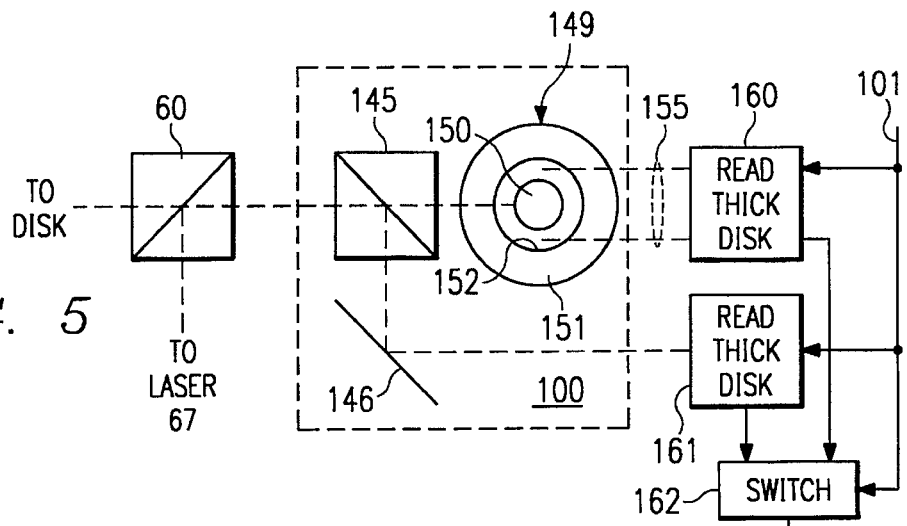

FIG. 5 illustrates another embodiment of filter 100. This embodiment has no moving parts. Reflected laser read beam 130 leaves beamsplitter or half-mirror 60 to pass through beamsplitter 145. Beamsplitter 145 deflects one-half of the reflected laser beam 130 energy to first surface mirror 146 that directs the deflected beam to read-thin-disk detector 161. Detector 161 is constructed as shown in optical read portion 99 elements 61, 62 and 79. This optical path is used for reading data from thin-substrate optical disks. A second optical path for reading data from thick-substrate optical disks includes annular filtering element 149. Annular filtering element 149 includes opaque central obscuration disk 150, concentric transparent member 152 constituting a pupil concentrically outlined by opaque support 151. Annular filtering element 149 outputs an annular beam 155 to read-thick-disk detector 160, constructed identically to read-thin-disk detector 161. Microprocessor 20 selects the detectors 160 and 161 by an actuating signal supplied over line 101. Simultaneously, the line 101 actuating signal actuates switch 162 that selects a detected output signal from either detector 160 or 161 for transmittal to focus and track circuit 54 and data circuits 75.

Figure 6:
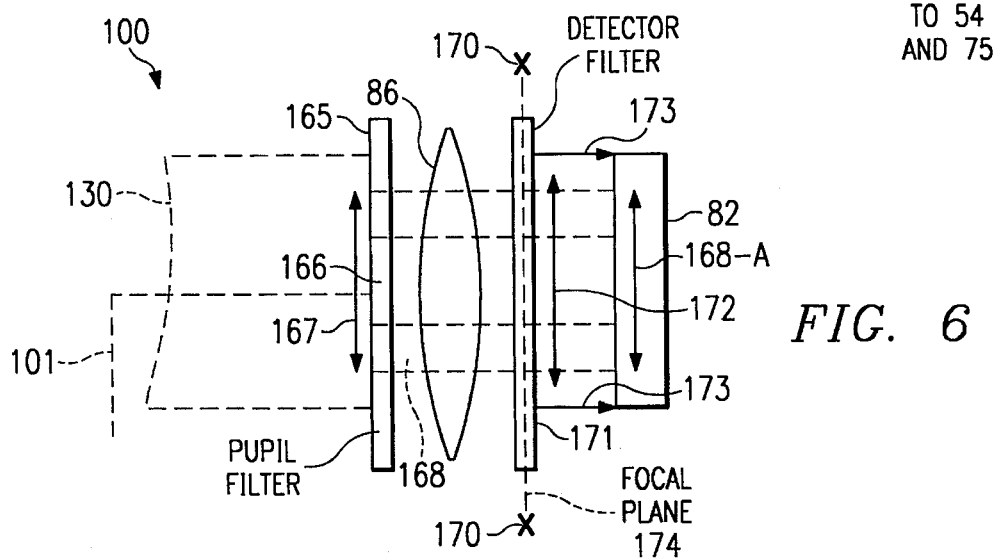
FIG. 6 illustrates an aperture filter arrangement having an effective numerical aperture less than an effective numerical aperture of the FIG. 1 illustrated system.

FIG. 6 diagrammatically illustrates a preferred embodiment of laser-beam annular filter 100. The description refers only to the light path leading to data photo detector 82. It is to be understood that the description applies equally to the light path leading to data photo detector 84. Annular filter element or pupil filter 165, suitably mounted (not shown) on support 33 of the FIG. 1 illustrated device, has an annular aperture forming a pupil indicated by double-headed arrow 167. Selectively opaque element(s) 166, disposed centrally in the pupil of pupil filter 165, provides annular filtering of impinging disk reflected laser beam 130 to produce annular laser beam 168 that travels to detector 82 through focussing lens 86 and detector filter 171. Selectively opaque element 167 may be a liquid crystal. Dashed line 101 indicates control over the selectively actuated annular filter element 167. For the liquid crystal version of annular filter element 167, a first electrical signal on line 101 makes the liquid crystal element 166 transparent while a second electrical signal on line 101 makes liquid crystal element 166 opaque. Thus, the first electrical signal actuates laser-beam annular filter 100 for operation with a thin-substrate optical disk while the second electrical signal actuates laser-beam annular filter 100 for operation with a thick-substrate optical disk.

FIG. 6 also diagrammatically represents an electro-mechanical version of the selectively actuated annular filter element 165. Line 101 is connected to a pivot motor (not shown), such as motor 142 (FIG. 4), that has a transparent rod (not shown) mounting annular filter 167 for pivoting motion into and away from the laser read beam respectively for operating with thick-substrate and thin-substrate optical disks.

Xs 170 indicate that annular laser beam 168 has undesired side lobes existing at focal plane 174 of lens 86. For removing the undesired side lobes, apertured plate or detector filter 171 is disposed in the focal region of lens 86, such as on data photo detector 82 as indicated by a pair of dashed-line arrows 173. The aperture 172 in detector filter 171 is matched in size to known diffraction limited spot size of the beam at focal plane 174. Annular beam 168 passes through aperture 172 removing the undesired side lobes 170 resulting in a clean focussed spot, represented by double-headed arrow 168-A, on detector 82.

FIG. 7 is a chart showing the relationships between obscuration ratios of laser-beam annular filter 100, severity of spherical aberration set forth in the number of aberration waves present in disk reflected laser beam 130 and the known Strehl ratios of optical merit. It is preferred that the obscuration ratio of any central obscuring element in laser-beam annular filter 100 lie between 0.4 and 0.95.

FIGS. 8–16 schematically illustrate selected embodiments of the present invention. For purposes of illustration only, the description of FIGS. 8–16 is arbitrarily directed to a light path in optical read portion 99 having elements 81, 82 and 86. FIG. 8 is a schematic of a preferred embodiment, as shown in FIG. 6. The preferred embodiment includes annular filtering element 165 or pupil filter and apertured plate or detector filter 206 (FIG. 6 detector filter 171). It is preferred that pupil filter 165 have an NA less than the NA of the optical system. The FIG. 9 schematic illustrates using only annular filtering element (pupil filter) 165 without a detector filter 206. FIGS. 10 and 11 illustrate central obscuration only pupil filters 200 respectively without and with detector filter (apertured plate) 206. FIGS. 12 and 13 illustrate a pupil filter 205 having an aperture for reducing NA respectively without and with a detector filter 206. The resulting reduced radius beam 138, although not having a reduced light intensity center, is an annular beam, as that term is used herein.

Pupil filters may take several forms. FIG. 14 illustrates an NA reducing pupil filter. R0 is the radius of the pupil (used for thin-substrate optical disks) while R1 is the radius of a reduced pupil. Opaque plate 132 (FIGS. 14–16) is apertured to define a pupil 207. In FIG. 14 annular obscuration element 210, which may be integral with plate 132, blocks peripheral light while central aperture 211 passes a central radially-reduced annular beam (See FIGS. 10 and 11) of reflected laser beam 130 (not shown in FIG. 14). FIG. 15 shows a central obscuring pupil filter. An annular beam of light in annular aperture 215 between R0 and R2 (FIG. 15) passes onto detector 82. FIG. 16 illustrates combining reducing NA and central obscuration in one filter. Annular plate 220, which may be integral with plate 132, reduces NA while central plate 221 provides central obscuration to produce an annular light beam in annular aperture 222 having reduced NA. As an example, each of the FIGS. 14–16 illustrated pupil filters may have plates 210, 131, 220 and 221 constructed as described above for FIGS. 4 through 6. Each of the pupil filters may be used with or without a detector filter.

The pupil and detector filters may be implemented as self-supporting light blocking materials (such as metal or plastic), as opaque coatings on a transparent substrate, as holographic filters, electro-optic devices, etc. The holographic filters create opaqueness by diffracting light out of the usual light path. Electro-optic devices, such as liquid crystals, respond to electrical control signals for creating opaqueness or transparency. The pupil filter may be placed any where in the read path.

The detector filter may be implemented in a multi-element detector element (not shown) wherein selection of detector elements to be sensed effect detection filtering. That is, only a small central portion of the detector elements are used for detecting data from thick-substrate optical disks while all or most of the detector elements are used for detecting data read from thin-substrate optical disks. Also, if the detector is separated from the detector filter, the detector does not have to be in the focal plane but should receive all of the light transmitted through the detector filter. The detector filter is in the focal plane.

As used herein the term "opaque" is not limited to a complete blocking of a laser beam by the above-described opaque disks need not block all of the laser beam impinging on the opaque disk, only that the intensity cross section of the resultant beam having an annulus of beam intensity greater than the intensity of the beam center as represented by the opaque disks. That is, opaqueness is to be read as causing laser beam intensity attenuation that is measurable by usual intensity measurement instruments.

While the invention has been particularly shown and described with reference to preferred embodiments thereof, it will be understood by those skilled in the art that various changes in form and details may be made therein without departing from the spirit and scope of the invention.

What is claimed is:

1. An optical data device having a laser for supplying a laser beam, an optical disk receiver means for sequentially removeably receiving one disk at a time of a plurality of optical disks as a received disk in a play position, optical means for communicating said supplied laser beam to each of said received optical disks and for receiving said supplied laser beam after being reflected by said each of said received optical disks as a reflected laser beam, a read optical portion in said optical means having laser beam receiving means and laser beam output means for transferring said reflected laser beam from said optical means to an optical detector:

an improvement, in combination:
first and second optical disks, each of said first and second optical disks respectively having first and second recording layers respectively disposed on thick and thin transparent substrates, each of said thick and thin substrates having a laser beam receiving surface through which said supplied and reflected laser beams traverse to and from the first and second recording layers, respectively;
said thick substrate having a first axial extent between said laser beam receiving surface of said thick substrate and said first recording layer;
said thin substrate having a second axial extent between said laser beam receiving surface of said thin substrate and said second recording layer;
said first axial extent being substantially greater than said second axial extent such that a laser beam traveling through said first axial extent of said first substrate is substantially inoperative to access said recording layer of said second one of said optical disks;
said read optical portion operative to read said second recording layer but not said first recording layer;
said read optical portion having filter means having a laser-beam annular filter means for reading said first recording layer; and
control means connected to said read optical portion and said filter means for actuating said read optical portion to selectively read said first and second disks, respectively.

2. The optical data device set forth in claim 1, in combination:
optical selecting means in said control means and connected to said laser-beam annular filter means for selectively interposing said laser-beam annular filter means between said optical detector and said laser beam receiving means for enabling reading from either said first or second recording layer.

3. The optical data device set forth in claim 2, in combination:
said thick substrate being not less than twice said axial extent of said thin substrate.

4. The optical data device set forth in claim 2, in combination:
said optical means including a write portion for writing data onto said second optical disk.

5. The optical data device set forth in claim 4, in combination:
said first and second optical disks respectively having machine-sensible indicia indicating said thick and thin substrates;
disk received sensing means connected to said optical disk receiver means for detecting and indicating said received optical disk while in a play position;
said optical selecting means having mode means connected to said disk received sensing means for responding to said indicating of said received optical disk to sense said machine-sensible indicia on said received optical disk for indicating that said received optical disk is either said first or second optical disk; and
said optical selecting means being responsive to said mode means indicating that said received optical disk is said second optical disk for enabling reading from and writing to said received optical disk and being responsive to said mode means indicating that said received optical disk is said first optical disk for enabling reading from but not writing to said received optical disk.

6. The optical data device set forth in claim 2, in combination:
said read optical portion including a plurality of photo detectors respectively receiving said reflected laser beam;
said laser beam filter means having a pivotable obscuration element pivotable between first and second pivoted positions:
said pivotable obscuration element including a pupil for passing said reflected laser beam along a given optical path toward said photo detectors; and
a holographic disk disposed in said pupil while in said first pivoted position for passing said reflected laser beam for reading data from said second optical disk and while in said second pivoted position for refracting said reflected laser beam away from said path for creating an annular laser beam from said reflected beam along said given optical path for reading data from said first optical disk.

7. The optical data device set forth in claim 1, in combination:

a focussing lens disposed between said optical detector and said laser-beam annular filter means, said focussing lens having a focal region adjacent said optical detector; and a detector filter disposed in said focal region and having a given aperture.

8. The optical data device set forth in claim 7, in combination:

said optical means having a predetermined numerical aperture; and said annular filter means having a numerical aperture less than said predetermined numerical aperture.

9. The optical data device set forth in claim 1, in combination:

said read optical portion including a plurality of photo detectors respectively receiving said disk reflected laser beam;

said laser-beam annular filter means having first and second optical paths;

a beam splitter in said laser-beam annular filter means splitting said reflected beam into first and second beams respectively to said first and second optical paths;

said first optical path passing said first beam to first predetermined ones of said photo detectors; and said second optical path having a pupil filter means for converting said second beam to an annular beam and for passing said annular beam to second predetermined ones of said photo detectors.

10. The optical data device set forth in claim 1, in combination:

said optical means having an effective numerical aperture;

an apertured means disposed between said laser-beam annular filter means and said optical detector and having a given numerical aperture less than said effective numerical aperture.

11. The optical data device set forth in claim 10, in combination:

optical selecting means in said control means and connected to said laser-beam annular filter means for selectively interposing said laser-beam annular filter means between said optical detector and said optical means for enabling reading from either said first or second recording layer;

said laser-beam annular filter means including a plurality of electro-responsive optical elements disposed respectively as an annular portion and a central portion disposed within said annular portion;

said electro-responsive optical elements being respectively responsive to first and second electrical signals to become opaque and transparent; and said optical selecting means having control means connected to said annular and central portions for first simultaneously supplying said first electrical signal to both said annular and central portions and second simultaneously supplying said first signal to said annular portion and said second signal to said central portion whereby said thin-substrate optical disk is read while said first electrical signal is simultaneously supplied to both said annular and central portions and said thick-substrate optical disk is read while said first and second electrical signals are simultaneously supplied to said annular and central portions.

12. The optical data device set forth in claim 11, in combination:

said electro-responsive optical elements comprising liquid crystal members.

13. The optical data device set forth in claim 1, in combination:

said laser-beam annular filter means having an apertured support plate having a circular pupil aperture with a cross-section not greater than a cross-section of said reflected laser beam;

an opaque disk disposed centrally of said circular pupil aperture;

support means supporting said apertured support plate and said opaque disk; and said support means having moving means for moving said opaque disk between a central position aligned with said reflected laser beam and a remote position in a non-blocking relationship to said reflected laser beam respectively for enabling reading said first optical disk and said second optical disk.

14. The optical data device set forth in claim 1, in combination:

optical selecting means in said control means and connected to said laser beam annular filter means for selectively interposing said laser-beam annular filter means between said optical detector and said optical means for enabling reading from either said first or second recording layer;

said second optical disk and said first optical disk being respectively disposed inside first and second disk cartridges; and said first and second disk cartridges respectively having first and second indications that said first and second disk cartridges respectively contain said first optical disk and said second optical disk;

said optical selecting means having means for sensing said first and second types of said disk cartridges for detecting and indicating said thin-substrate and thick-substrate optical disks, and said selecting means responding to said indicated thin-substrate and thick-substrate optical disk indications to respectively actuate said laser beam filter to not interpose and to interpose said laser beam filter for respectively enabling reading said thin-substrate and thick-substrate optical disks.

15. The optical data device set forth in claim 1, in combination:

optical selecting means in said optical means and connected to said laser-beam annular filter means for selectively interposing said laser-beam annular filter means between said optical detector and said optical means for enabling reading either said first or second recording layers;

said first optical disk and said second optical disk respectively having machine-sensible indicia indicating said first and second optical disks;

receiver means for removably receiving a predetermined one of said optical disks in a play position of said data device as a received optical disk;

disk received sensing means connected to said receiver means for detecting and indicating said received optical disk;

optical selecting means having mode means connected to said disk received sensing means for responding to said indicating of said received optical disk to sense said machine-sensible indicia on said received optical disk for indicating that said received optical disk is either first or second optical disk; and said optical selecting means being responsive to said mode means indicating that said received optical disk is said second optical disk for enabling reading from and writing to said received optical disk and being responsive to said mode means indicating that said received optical disk is said first optical disk for enabling reading from but not writing to said received optical disk.

16. The optical data device set forth in claim 1, in combination:

said optical system having a predetermined numerical aperture; and said laser-beam annular filter means having a numerical aperture less than said predetermined numerical aperture.

17. A method of operating an optical data device having a disk receiver for removeably receiving a given optical disk, said given optical disk being one of a plurality of optical disks of first or second type, said optical disks of said first type being thick-substrate optical disks, said optical disks of said second type being thin-substrate optical disks, optical means for reading from and writing on said thin-substrate optical disks and having optical characteristics preventing reading or writing from and to said thick-substrate optical disks, said reading including emitting a laser read beam to impinge on said given optical disk for reflecting said laser read beam from a recorded data layer in said given optical disk as a reflected laser beam carrying information recorded in said recorded data layer:

the method including steps:

receiving said given optical disk;

sensing said given optical disk for determining and indicating whether said given optical disk is one of said first type of optical disks or one of said second type of optical disks;

establishing a laser-beam annular filter;

responding to said indicating that said given optical disk being said one of said first type of optical disks for indicating that data may be written to or read from said given optical disk; and responding to said indicating said given optical disk being one of said disks of said second type for indicating that data may be read from but not written to said given optical disk and further responding to said indicating that said given optical disk being one of said optical disks of said second type for interposing said laser beam annular filter in a read path portion of said optical means for converting said reflected laser beam cross-section from a circular cross-section to an annular cross-section for enabling reading from said given optical disk being said predetermined one of said second type optical disks.

18. The method set forth in claim 17, including a step:

in said responding step, responding to said indicating that said given optical disk being one of said disks of said first type to remove said laser-beam annular filter from said read path portion.

19. The method set forth in claim 17, including steps:

making said laser beam annular filter an electrically responsive element that responds to a first electrical signal to pass said reflected laser beam without filtering said laser read beam and responding to a second electrical signal to pass said reflected laser beam through said d laser beam annular filter; and in said responding step, responding to said indicating that said given optical disk being one of said disk of said first type for sending said first electrical signal to said laser beam annular filter and responding to said indicating that said given optical disk being one said disks of said second type for sending said second electrical signal to said laser beam annular filter.

20. The method set forth in claim 19, including steps:

in said establishing step, providing an electro-responsive element means in said laser beam annular filter, stationarily concentrically disposing an apertured opaque plate in said laser beam annular filter for receiving and passing said laser read beam from said electro-responsive element; and supplying said first and second electrical signals to said electro-responsive element means for respectively actuating said electro-responsive element means between annular filtering and non-filtering states.

21. The method set forth in claim 20, including steps:

making said stationarily-disposed apertured plate and said electro-responsive element means to provide an obscuration ratio between 0.4 and 0.95.

22. The method set forth in claim 20, including steps:

providing liquid crystal elements in said electro-responsive element means.

23. The method set forth in claim 17, including steps:

disposing an apertured plate means having a given aperture between said laser-beam annular filter and a photo detector.

24. The method set forth in claim 23, including steps:

interposing a focussing lens between said laser-beam annular filter and said photo detector;

establishing a focal plane for said focussing lens that is proximate to said photo detector; and disposing said apertured plate means in a predetermined juxtaposition to said focal plane.

25. The method set forth in claim 17, including steps of:

in said establishing step, establishing first and second optical paths in said laser-beam annular filter, providing annular filtering in said first optical path for producing an annular laser beam, establishing said second optical path without said annular filtering for maintaining said reflected laser beam; and disposing first and second photo detectors in respective optical communication with said first and second paths for respectively receiving and detecting said annular and said maintained laser beams.

26. The method set forth in claim 17, including steps:

in said establishing step, disposing an apertured plate in said laser-beam annular filter having a pupil for receiving and passing said annular laser beam through said pupil;

disposing a holographic disk centrally of said pupil for receiving said reflected laser beam, selecting said holographic disk to respond to said reflected laser beam in a first predetermined orientation with respect to said reflected laser beam to pass a central portion of said reflected laser beam and in a second predetermined orientation with respect to said reflected laser beam to refract said central portion of said reflected laser beam away from a remaining annular portion of said reflected laser beam; and in said responding step reorienting said holographic disk to said first predetermined orientation for enabling reading said thick-substrate optical disks and to said second predetermined orientation for reading said thin-substrate optical disks.

27. The method set forth in claim 17, including steps;

optically interposing an apertured plate between said laser-beam annular filter and a photo detector in said optical means for passing said annular laser beam to said photo detector.

28. The method set forth in claim 27, including a step:

interposing a focussing lens in said optical means between said laser-beam annular filter and said apertured plate for focussing said annular beam at said apertured plate.

29. The method set forth in claim 28, including a step:

mounting said apertured plate on said photo detector.

30. A method of sensing data from optical disks of diverse types of optical disks, each of said optical disks of said diverse types having a transparent substrate through which a laser beam reaches and returns as a reflected laser beam from a reflective recorded layer embedded in each of said optical disks:

including steps of:
establishing an optical means for reading and writing data from and to said optical disks of a first type, said transparent substrate of each of said optical disks of said first type having a first predetermined axial thickness;

sensing data from and writing data to said optical disks of said first type;

establishing a laser-beam annular filter in a read portion of said optical means for receiving said reflected laser beam to convert a cross-sectional shape of said reflected laser beam to an annular cross-sectional shape;

placing a focussing lens in said optical means for receiving and focussing said annular beam to a focal plane;

disposing an apertured plate between said focussing lens and a photo detector in said optical means, disposing said photo detector being at said focal plane;

selecting said apertured plate to have a numerical aperture less than a numerical aperture of said optical means;

providing optical disks of a second type, said transparent substrate of each said optical disk of said second type having an axial thickness substantially greater than said first predetermined axial thickness; and while sensing data from but not writing data to one of said optical disks of said second type receiving and passing a laser beam reflected from said one of said optical disks of said second type through a central obscuration means and an apertured plate having an aperture interposed between said central obscuration means and said photo detector for supplying an annular laser beam substantially without side lobes to said photo detector.

31. Apparatus for sensing data from optical disks of diverse types, each one of said optical disks having a transparent substrate through which a laser beam reaches and returns as a reflected laser beam from a reflective recorded layer embedded in each of said optical disks;

an improvement, including, in combination:

optical means for reading and writing data from and to said optical disks of a first one of said types, each of said optical disks of said first one of said types having said transparent substrate with a first predetermined axial thickness;

said optical means sensing data from and writing data to said optical disks of a first one of said diverse types;

a laser-beam annular filter in said optical means for receiving said reflected laser beam to convert a cross-sectional shape of said reflected laser beam to be an annular beam;

a focussing lens in said optical means for receiving and focussing said annular beam to a focal plane;

photo detector disposed adjacent said focal plane for receiving said annular beam;

an apertured plate disposed between said focussing lens and said photo detector in said optical means at said focal plane;

said apertured plate having a numerical aperture less than a numerical aperture of said optical means; and said optical means sensing data from but not writing data to optical disks of a second one of said types including receiving and passing a laser beam reflected from said optical disks of said second one of said types through a central obscuration means and said apertured plate for supplying an annular laser beam without side lobes to said photo detector.

* * * * *